United States Patent

Lowe

[15] 3,672,444
[45] June 27, 1972

[54] WATER HEATING SYSTEM

[72] Inventor: Leonard F. Lowe, East Stroudsburg, Pa.

[73] Assignee: The Patterson-Kelley Co., Inc., East Stroudsburg, Pa.

[22] Filed: June 3, 1970

[21] Appl. No.: 43,160

[52] U.S. Cl..................................165/39, 122/32, 165/108, 165/132, 236/23, 219/316, 219/328, 219/331
[51] Int. Cl.........................................F28f 27/00
[58] Field of Search................165/39, 108, 132; 236/19, 23, 236/18; 122/32; 219/316, 328, 331

[56] References Cited

UNITED STATES PATENTS 3,446,939  5/1969  Morgan et al..........................165/108

Primary Examiner—Albert W. Davis, Jr.
Attorney—Bean and Bean

[57] ABSTRACT

A water heating system is provided, comprising in combination, a water storage tank having a heated water outlet and a heater shroud extending into the tank and being open at its inner end and closed at its outer end. A heater is disposed within the shroud and operates under control of a heat supply regulator. A main conduit system includes a continuously operating pump having its intake end in fluid communication with the interior of said tank at an upper level thereof and its discharge is arranged to deliver water into the outer closed end portion of the shroud. A feed water supply inlet is arranged in closed communication with said main conduit system; a water temperature sensor is disposed in the region of water withdrawal into said main conduit system, and, is operable to regulate the heat supply. A branch outlet conduit leads from the lower level of the tank into the main conduit line; and a feed water by-pass conduit is arranged to have its intake in communication with the feed water inlet and to deliver into said tank in close proximity to the temperature sensor. The branch outlet and bypass conduit devices are provided with means whereby improved sensitivity and accuracy of control of the heat supply is acquired, in response to heated water withdrawals from the system.

15 Claims, 1 Drawing Figure

INVENTOR.
LEONARD F. LOWE
BY
Bean + Bean
ATTORNEYS

WATER HEATING SYSTEM

BACKGROUND AND OBJECTS OF THE INVENTION cost.

The invention relates to water storage and heating devices such as are designed for automatically maintaining the storage water at the desired temperature, while drawing upon the heat source only as may be needed to maintain the supply water at the specified temperature. This invention provides an improved heat control system whereby the water storage tank will automatically furnish hot water at a substantially constant temperature, and in the quantities required; regardless of how sudden or erratic the demands may be, or how quickly the hot water must be drawn. Still further, the system will furnish the required hot water as aforesaid at minimum cost.

GENERAL DESCRIPTION

Generally stated, the invention contemplates an improved method of heating water and storing it in a reduced size accumulator tank to have it available to supply either constant or intermittent demands for either small or large quantities of hot water. The system includes a heater unit and an automatically controlled heat supply control device. On start-up, cold feed water enters the outer end of a shroud housing the heater unit which is disposed to extend into the tank; and from thence moves into the main body of the tank. A temperature sensor is located in the main body of water within the tank and is connected to control the heat supply control device. A conduit system including a continuously running pump is arranged to withdraw heated water from the vertical mid-section of the tank and redeliver it into the outer end of the heater shroud. A bypass conduit is provided to interconnect the volume of water in the area of the sensor and the cold water inlet, to "anticipate" heat supply requirements upon sudden withdrawals of hot water, as will be explained in detail hereinafter. A branch outlet conduit of relatively small size leads from the lower level of the tank into the continuously circulating main conduit system to prevent temperature stratification conditions inside the tank.

The invention may be practiced in combination with a storage water tank of any preferred shape, with an outlet for delivery of heated water to the water-consuming equipment. Although any suitable type of heat supply medium may be employed; as shown herein, a return-bent tube bundle type heat exchange unit extends into the tank in the lower level thereof and is sheathed by a casing enclosing the tube bundle except at one end thereof. The tube bundle comprises banks of return-bent tubes arranged in spaced relation, and the tubes are arranged to conduct steam (as the heat supply medium) from any suitable source, and to deliver the condensate through a suitable trap.

Water flow rate and pattern control baffles are associated with the tubed shroud to cause the flow of water to zig-zag through the housing enclosing the tubes; the housing being joined at one of its ends to the tube sheet and being open at its other end interiorly of the tank. Thus, the cold feed water travels in heat exchange relation around the tubes prior to discharge from the open end of the shroud into the main section of the tank. As stated, the tubes are arranged to be fed with steam (or other hot fluid) from any suitable source such as may be required to maintain the hot water supply delivery from the tank at the prescribed temperature.

The system features an arrangement which may be readily constructed in unit form; fully self-contained, and requiring minimum floor space; and is therefore suitable for installation in out-of-way locations. It is readily connected to existing piping systems, and normally draws upon the associated steam generating boiler in such limited manner as to avoid interference with constant steam pressures at other associated steam operated equipment. Thus, the heater of the present system will normally operate to even-out the boiler load, thereby improving its efficiency and life span.

THE DRAWING

FIG. 1 is a vertical sectional view of a typical upright tank type water storage tank and heater arrangement embodying the invention.

DETAILED DESCRIPTION

Figure 1:
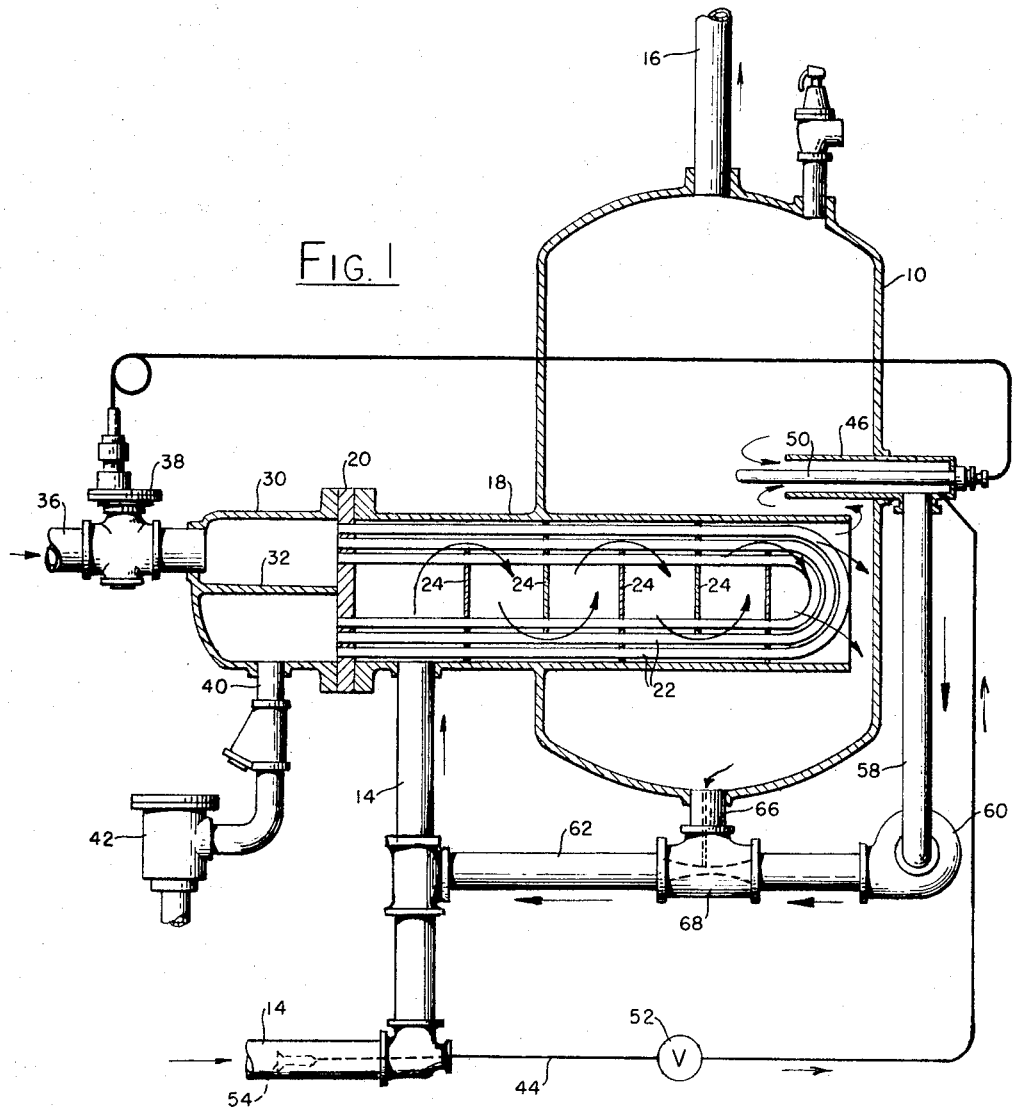

As illustrated in the drawing herewith, the invention may be embodied by way of example in connection with a water storage supply tank as illustrated at 10, which as shown herein is generally of cylindrical form and is supported to stand vertically upon any suitable means (not shown). It is to be understood however that the tank 10 may in lieu thereof be provided of any other preferred shape or form and may stand in any other attitude. In any case. the tank 10 will include a cold or feed water supply conduit connection as indicated at 14, and one or more heated water outlet connections such as indicated at 16.

The heat exchange device of the system is illustrated as comprising an elongated shroud or casing 18, which extends into the tank 10 and carries a tube sheet 20 at its outer end into which are mounted the terminal ends of a bank of reverse bent tubes 22. Baffle plates 24 disposed vertically and alternately occupying upper and lower portions of the casing 18 function simultaneously as vertical supports for the tubes 22; as water flow rate controllers; and as water travel guide devices so as to cause the water circulating through the casing 18 to pursue a vertically zig-zag path through the casing and around the heat exchange tubes 22 as indicated by the directional arrows in the drawing. It is a particular feature that the baffles 24 control the rate of flow of the water circulating through the shroud.

A manifold cover or bonnet as indicated at 30 is fixed to the outer face of the tube sheet 20, and is provided with internal partition means 32. The bonnet is dimensioned to bear firmly against the tube sheet when the unit is in assembly, so as to thereby internally divide the fluid chamber portion thereof into sections, as shown in the drawing. Thus, it will be appreciated that the tubes 22 may be initially assembled upon the tube sheet 20, and that this subassembly may then be slip-fitted into the casing 18. The tube sheet and manifold assembly may then be firmly bolted or otherwise fixed in place to complete the mounting of the heat exchange unit in the tank.

Thus, it will be appreciated that upon withdrawals of water from the interior of the tank 10 through the outlet 16, cold feed water will replace it through the conduit 14; flowing first into the outer end of the casing 18, wherefrom it will proceed in a vertically zig-zag path as indicated by the directional arrows until it emerges from the rear end of the casing 18 into the main body of the storage tank 10.

As shown herein, the heat exchange component of the device of the present invention embodies means for drawing upon any suitable supply of heat such as live steam; waste heat steam; or other hot liquid, from any associated system. For this purpose a live steam or other heated fluid inlet conduit is shown as indicated at 36 to deliver hot fluid into the bonnet 30 as controlled by a valve 38; the return outlet for the spent heating fluid being indicated at 40 in connection with a condensate trap 42.

It is a particular feature of the invention that a bypass conduit as indicated at 44 interconnects the cold feed water inlet 14 with a housing 46 which encloses a temperature sensing "-bulb" as indicated at 50; the unit being disposed interiorly of the main body portion of the water supply within the tank 10. A manually adjustable valve 52 is provided in the line of the conduit 44 to regulate the operation of the device so that when the rate of withdrawal of hot water from the outlet 16 is relatively slow, the pressure drop in the tank and within the interior of the casing 46 will be insufficient to cause any appreciable flow of cold water through the bypass conduit 44.

Thus, under such conditions of normal withdrawals, the bypass 44 will remain inactive; and as heated water is slowly drawn out of the top of the tank cold water replaces it by flowing through the inlet 14 and through the housing 18 and then into the body of the tank. Here it gradually mixes and lowers the temperature of the water within the tank in the area of the bulb 50. The latter thereupon operates the valve control 38 so as to automatically adjust the steam supply flow rate as may be required to maintain the temperature of the main body of water within the tank within the prescribed range of temperatures therefor.

However, whenever large quantities of hot water are rapidly withdrawn from the top of the tank, the baffling devices 24 within the housing 18 operate to retard the rate of responsive replacement flow of water from the inlet 14 through the housing 18. Hence, a substantial hydrostatic pressure differential is immediately established between the interior of the casing 46 and the inlet end portion of the housing 18. This pressure differential functions to cause cold replacement water to immediately flow from the cold feed water inlet 14 through the conduit 44 and into the bulb shroud 46. The advent of cold supply water directly into the shroud surrounding the sensing bulb 50 immediately causes the latter to call upon the steam control valve 38 for a corresponding increase in flow of heating fluid.

Thus, the system of the present invention does not wait upon a general mixing of cold inlet water into the large volume of water occupying the main body of the tank (and a consequent gradual lowering of the temperature thereof in the neighborhood of the sensing bulb) as in the case of conventional heating arrangements. Instead, in the case of the present invention, any heavy withdrawal is immediately signaled to the sensor 50 which thereupon responds instantly to call upon the heating supply for a commensurate increase of flow of heating fluid. Hence, slow water withdrawals from the tank 10 are matched by slow and correspondingly economical heat additions; while heavy withdrawals of hot water are matched by rapid and commensurate heat additions.

As indicated at 54 in the drawing herewith, the heat supply requirement "anticipation" feature of the system is augmented by providing an enlarged funnel-shaped opening for the intake end of the bypass conduit 44; the open-mouth end of the funnel-shaped member being directed against the direction of cold water inflow through the inlet conduit 14. By virtue of this arrangement a cold water flow pressure magnification within conduit 44 is attained; thereby assuring even more sensitive and positive operation of the system.

A constant circulation conduit system is provided to interconnect the outer end of the sensor shroud 46 and the outer end of the tube shroud 18; and as illustrated herein the circulation system may comprise a conduit 58; a constantly running pump 60; and a conduit 62 leading into closed communication with the outer end of the tube shroud 18 through the fresh water inlet conduit 14. Thus it will be appreciated that operation of the pump 60 will provide a constant circulation of water from the upper portion of the tank 10; through the sensing bulb casing 46; the conduit 58; the conduit 62; and then back into the outer end of the tube shroud 18 via the conduit 14. Hence, the water in the storage system will be constantly circulating in accordance with the directional arrows shown in the drawing herewith.

It is also a particular feature of the present invention that a branch fluid connection is provided between the bottom of the tank 10 and the main circulation conduit system 58–60–62–14 whereby a small amount of water will be constantly withdrawn from the bottom of the tank and included in the water circulating pattern. Thus, as shown in the drawing herewith, a branch outlet conduit 66 is provided which leads into the intake port of a venturi type fitting 68 disposed in the line of circulation conduit 62. By reason of this arrangement, as water circulates from the upper portion of the tank 10 through the pump 60 and the conduit 62 for return back through the heater shroud, a relatively small volume of water will be simultaneously withdrawn from the bottom of the tank 10 into the water circulating stream. This operates to prevent formation of temperature stratification patterns within the tank 10; thereby providing an overall improved storage water heating system.

I claim:

1. A water heating and storage unit comprising in combination with a single tank in which water is to be heated and stored, a water heating device disposed within said tank and comprising an elongate shroud extending into said tank from externally thereof and being closed at its outer end and having a heated water discharge opening at its inner end, and a water heater disposed within said shroud in heat exchange relation with water therewithin, a main conduit system including a continuously operating pump having its intake end drawing water from interiorly of said tank, and its discharge end in open communication with the interior of the closed end portion of said shroud, a branch outlet conduit leading from the lower level of said tank into said main conduit, a water temperature sensor disposed within the intake end portion of said main conduit system, a heater energizing control device connected to said heating device to regulate the operation of said heater in accord with water temperature variations in the region of said sensor, and in response thereto, a feed water supply coupled into said main conduit system, a heated water withdrawal outlet adjacent the top of said tank, and a by-pass conduit connected at its intake end to said feed water supply and having its other end discharging against said sensor.

2. A water heating and storage unit as set forth in claim 1 wherein said shroud includes water passage baffling means operable to retard the rate of water passage therethrough.

3. A water heating and storage unit as set forth in claim 2 wherein said branch conduit leading from the lower level of said tank provides a restricted orifice for withdrawal of water from the lower level of the tank at lesser rate than the withdrawal through said conduit system from the upper levels of said tank.

4. A water heating and storage unit as set forth in claim 2 wherein the inlet end of said by-pass conduit is provided with a device which is responsive to feed water supply flow rate changes so as to magnify the rate to delivery of feed supply water to said sensor when the heated water withdrawals from the unit are rapidly imposed.

5. A water heating and storage unit as set forth in claim 3 wherein said restricted orifice is associated with a venturi shaped portion of said main conduit whereby to provide a branch flow rate sensitive to variations in rate of flow through said main conduit.

6. A water heating and storage unit comprising in combination with a single tank in which water is to be heated and stored, said tank having a heated water withdrawal outlet adjacent the top thereof;

a water heating device disposed in said tank and comprising an elongate shroud extending into the tank from externally thereof and having a heated water discharge opening at its inner end located in spaced relation both to the top and the bottom of said tank to define a first region between said discharge opening and said heated water withdrawal outlet within which is located a reserve mass of heated water immediately available to said heated water withdrawal outlet and also a second region below said discharge opening within which heated water more remote from said heated water withdrawal outlet is stored, and a water heater disposed in said shroud in heat exchange relation to water therewithin;

means for introducing cold feed water into the closed end of said shroud to replenish water withdrawn through said heated water withdrawal outlet and to discharge same into the interior of said tank after having passed in heat exchange relation to said heater;

recirculation means for continuously withdrawing water from both said first and second regions and reintroducing it into said closed end of the shroud for discharge back into said tank, said recirculation means including a continuously operating pump having an inlet end portion communicating with said first region of the tank; and means for controlling said heater in accord with water temperature conditions in said tank and including a water temperature sensor in said inlet end portion for exposure to heated water within said first region and to heated water from said first region which is withdrawn therefrom by said pump.

7. A water heating and storage unit as defined in claim 6 including means responsive to heated water withdrawal rates from said tank which exceed a selected value for discharging cold feed water against said sensor.

8. A water heating and storage unit as defined in claim 7 wherein said recirculation means also includes a branch conduit communicating with said second region of the tank and suction means on the discharge side of said pump for withdrawing water through said branch conduit as a function of flow through said pump.

9. A water heating and storage unit as defined in claim 6 wherein said recirculation means also includes a branch conduit communicating with said second region of the tank and suction means on the discharge side of said pump for withdrawing water through said branch conduit as a function of flow through said pump.

10. A water heating and storage unit as defined in claim 9 wherein said inlet end portion of the recirculation means is located immediately above the discharge opening of said shroud.

11. A water heating and storage unit as defined in claim 6 wherein said inlet end portion of the recirculation means is located immediately above the discharge opening of said shroud.

12. A water heating and storage unit as defined in claim 7 wherein said inlet end portion of the recirculation means is located immediately above the discharge opening of said shroud.

13. A water heating and storage unit as defined in claim 8 wherein said inlet end portion of the recirculation means is located immediately above the discharge opening of said shroud.

14. A water heating and storage unit as defined in claim 11 wherein said inlet end portion is in the form of a housing projecting into said tank and said sensor is located within said housing and projects into said first region of the tank.

15. A water heating and storage unit as defined in claim 14 including means for injecting cold feed water into said housing remote from the projecting end of said sensor in response to heated water withdrawal from said tank which exceeds a selected value.

* * * * *

PO-1050
(5/69)

UNITED STATES PATENT OFFICE
CERTIFICATE OF CORRECTION

Patent No. 3,672,444          Dated June 27, 1972

Inventor(s) Leonard F. Lowe

It is certified that error appears in the above-identified patent and that said Letters Patent are hereby corrected as shown below:

Col. 4, line 45 "to delivery" should be --of delivery--.

Signed and sealed this 5th day of December 1972.

(SEAL)
Attest:

EDWARD M. FLETCHER, JR.          ROBERT GOTTSCHALK
Attesting Officer          Commissioner of Patents